United States Patent [19]

Huydts

[11] Patent Number: 4,825,659

[45] Date of Patent: May 2, 1989

[54] CONTROL SYSTEM FOR A HYDRAULICALLY ACTUATED PRESS

[75] Inventor: Eduard J. C. Huydts, Düsseldorf, Fed. Rep. of Germany

[73] Assignee: G. Siempelkamp GmbH & Co., Krefeld, Fed. Rep. of Germany

[21] Appl. No.: 491,569

[22] Filed: May 4, 1983

[30] Foreign Application Priority Data

May 4, 1982 [DE] Fed. Rep. of Germany ....... 3216563

[51] Int. Cl.[4] ............................................ F16D 31/02

[52] U.S. Cl. ........................................ 60/413; 60/425; 91/514; 91/532

[58] Field of Search ........................ 72/453.01, 453.02; 60/413, 414, 425, 428, 419, 431; 91/514, 515, 532

[56] References Cited

U.S. PATENT DOCUMENTS

| | | | |
|---|---|---|---|
| 3,677,009 | 7/1972 | Thatcher | 91/532 |
| 3,913,450 | 10/1975 | MacGregor | 91/519 |
| 4,018,052 | 4/1977 | Laussermair | 60/414 |
| 4,147,034 | 4/1979 | Johnson | 60/486 |
| 4,433,612 | 2/1984 | Spielvogel et al. | 91/514 |

FOREIGN PATENT DOCUMENTS

| | | | |
|---|---|---|---|
| 2022812 | 11/1974 | Fed. Rep. of Germany . | |
| 2551585 | 5/1976 | Fed. Rep. of Germany . | |
| 2349351 | 2/1981 | Fed. Rep. of Germany . | |
| 3017406 | 11/1981 | Fed. Rep. of Germany . | |
| 0598782 | 3/1978 | U.S.S.R. | 60/414 |

OTHER PUBLICATIONS

Patent Application (in German), pp. 1-5 and 1 Sheet of Drawing, Demag Aktiengesellschaft, Duisburt, 20 Aug. 1953.

*Primary Examiner*—Edward K. Look

*Attorney, Agent, or Firm*—Herbert Dubno

[57] ABSTRACT

A hydraulic-control system for a hydraulic press utilizes a main power unit consisting of a pump and a flywheel which delivers the energy necessary for a working stroke to at least one cylinder of the press. An auxiliary power unit consisting of an electric motor and another pump driven thereby is connected to the hydraulic network to drive the first mentioned pump as a motor and rotate the flywheel to increase the energy stored therein.

7 Claims, 1 Drawing Sheet

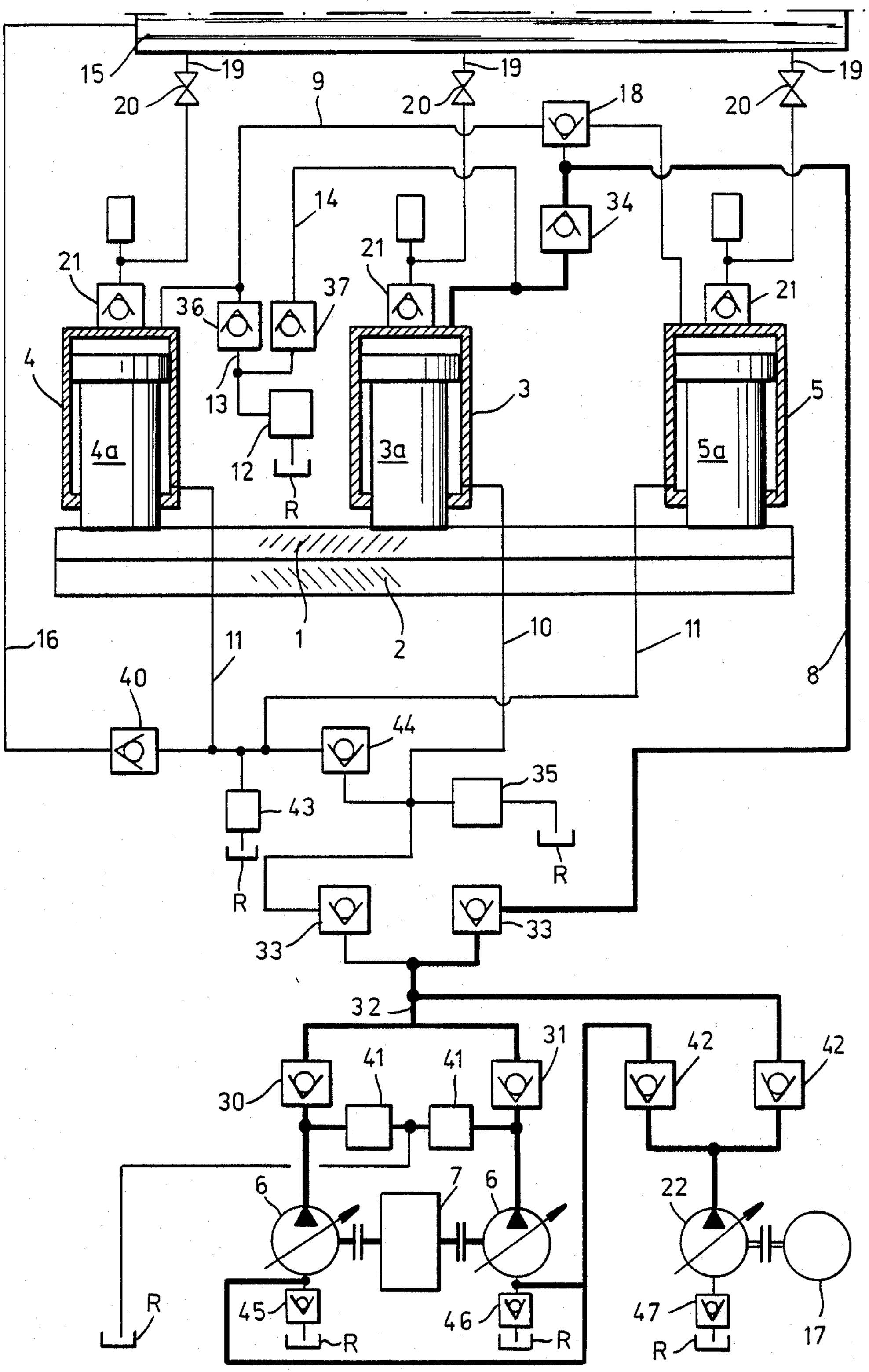
15
19
20
9
18
14
34
21
36
37
4
13
12
R
4a
3a
3
5a
5
1
2
16
11
10
8
40
44
35
43
R
33
32
30
41
31
42
6
7
22
17
45
46
47

CONTROL SYSTEM FOR A HYDRAULICALLY ACTUATED PRESS

FIELD OF THE INVENTION

The present invention relates to a hydraulically actuated press and, more particularly, to a control system for the hydraulic actuation arrangement of a hydraulic press.

BACKGROUND OF THE INVENTION

Hydraulic presses generally comprise a pair of platens at least one of which is displaceable toward the other in a press frame or structure (see my U.S. Pat. No. 4,123,929) and one of which may form a bed of the press while the other is a platen mounted on the head.

Generally the hydraulic actuation system for such a press comprises a number of hydraulically supplied piston and cylinder arrangements, hereinafter referred to generally as hydraulic cylinders, which are disposed between a support member and the movable platen and are extensible and contractable by the hydraulic system to close or open the press, i.e. shift the movable platen toward or away from the opposite platen.

It is also known to provide, in such systems, a variable-displacement pump i.e. a pump whose displacement per revolution can be varied, to supply the hydraulic cylinder or hydraulic cylinders and to provide an energy storage system for delivering the energy required during the operating stroke of the press. This energy storage system can include a flywheel which can be connected to the pump shaft. Presses of this type can be single-level or multilevel presses, e.g. for the production of pressed board or for laminating pressed board or the formation of similar composites, and even deep drawing presses.

In a press system of this type (see German Pat. No. 2,349,351), the variable-displacement pumps can be operated by an electric motor and the return flow of the hydraulic medium can also be used to accelerate the flywheel and thereby charge the latter with energy. In this case, the flow through the pump is such that the pump can be constituted as a motor (see German patent document DE-AS No. 20 22 812).

While these systems are effective once they are in full operation, problems are encountered when startup of the press is necessary and an initial or minimum energy charge must be imparted to the flywheel. When the flywheel is fixed to the pump shaft, the high inertia required to drive the shaft means with an electric motor coupled thereto must likewise overcome this inertia and must develop extremely high starting torques. This necessitates a motor of larger capacity and current drain than is desirable, as well as associated devices to enable the motor to be effectively coupled to the pump shaft such as running clutches and other mechanical and electrical elements which all must have comparatively large dimensions and capacities.

Not only are the capital costs engendered by this relationship of the check motor to the high inertia flywheel and variable-displacement pump, substantial, but operating and maintenance costs are considerable as well.

OBJECTS OF THE INVENTION

It is the principal object of the present invention to provide an improved control system for a hydraulic press whereby the aforedescribed disadvantages are avoided, effective results can be obtained with the electric system of lower power, and specifically, standard electric motors can be used without special accessories or associated devices.

Still another object of the invention is to provide an improved hydraulic press utilizing the flywheel energy storage system whereby disadvantages resulting from the need to couple an electric motor with the flywheel shaft can be avoided.

Yet another object of this invention is to provide a hydraulic press and a hydraulic drive or control system for such a press whereby the disadvantages of the earlier system can be obviated.

SUMMARY OF THE INVENTION

These objects and others which will become apparent hereinafter are attained, in accordance with the present invention, in a hydraulic press which can be utilized for the purposes described but can have any purpose of which hydraulic presses have been used and which comprise a pair of press members at least one of which is movable toward the other, the hydraulic actuating system including at least one hydraulic cylinder operatively braced against the movable press member, at least one variable-displacement hydraulic pump connected in a hydraulic circuit with the hydraulic cylinder to supply fluid to a compartment thereof and thereby displace the movable press member, a flywheel connected to the shaft of this pump and adapted to store energy which is delivered during the operating stroke to the pump and thereby translated by the variable-displacement pump into fluid pressure which generates the power stroke of the press or augments this power stroke, a further variable-displacement pump driven by an electric motor and means for connecting this further pump to the hydraulic circuitry so that the output from the further pump can be forced through the first-mentioned variable-displacement pump or power-stroke pump, in the direction of the power-stroke flow, to drive this latter pump as a motor and rotate the flywheel during starting or other energy-charging requirement of the flywheel.

In other words, the invention provides an additional variable-displacement pump which is connected with an electric motor and is not provided with a flywheel which, before a working stroke of the press, has its output connected to the input side of the power-stroke pump for supplying rotational energy to the flywheel by operating the power-stroke pump as a motor.

Surprisingly, it has been found that the system of the invention can utilize a motor and electrical installation whose power is reduced by one-third or more for a press of given capacity in which the electrical installation was used to drive the shaft of the power-stroke pump and the flywheel directly. In addition only the standard electric motors are required.

BRIEF DESCRIPTION OF THE DRAWING

The above and other objects, features and advantages of the present invention will become more readily apparent from the following description, reference being made to the accompanying drawing, the sole FIGURE of which is a hydraulic circuit diagram illustrating the invention.

SPECIFIC DESCRIPTION

In the drawing I have shown highly diagrammatically, a deep drawing press which is diagrammatically shown to have a press ram or upper platen 1, the latter carrying the deep-drawing stamp or male-forming member 2. The lower-press member, forming the female or die portion of the deep-drawing device has not been illustrated.

The ram 1 is provided with a plurality of spaced-apart hydraulic cylinders 3, 4 and 5 which are arranged to retract the ram from the lower portion of the pressing die and to drive the ram downwardly in the working stroke, i.e. are so-called double-acting cylinders.

In general, a number of power units 6, 7 will be provided for such a press. Each such power unit can comprise at least one variable displacement pump, e.g. of the swash plate axial-piston type, having a rotor connected to a flywheel 7. In this embodiment, the flywheel 7 is coupled to two pumps 6.

The flywheel 7 stores the energy required for a working stroke of the press or at least a greater part of the energy required for this purpose.

In the working stroke of the press, as represented by heavy lines in the drawing, the pumps 6, driven by the flywheel 7, draw fluid from the reservoir represented at R and displace the fluid past check valves 30 and 31 to a common output pipe 32 from which the fluid is forced past one of the check valves 33 to a line 8 which delivers it to the hydraulic cylinder 3, for example, past a check valve 34. The fluid on the opposite side of the piston is carried via line 10 and a pressure relief valve 35 to the reservoir R.

The retraction stroke permits the pressure fluid to be delivered via lines 10 and 11 to the cylinders 3-5 while lines 8 and 9 and the associated cylinder compartments are connected via a decompression (pressure-relief) valve 12, associated check valves 36 and 37 and the lines 13 and 14 of the reservoir R.

Hydraulic fluid which is displaced via the return flow line 16 is delivered to the oil tank or reservoir 15.

As has already been mentioned, the flywheel 7 is so dimensioned that it can deliver at least the greater part of the energy required for a working stroke. Usually, however, the flywheel is dimensioned so that it can deliver enough energy for a number of such working strokes.

The switching of the system can be such that during the working stroke initially only the central cylinder 3 is connected to the pumps 6 to be driven with energy supplied by the flywheel 7. This has been represented by the heavy lines in the drawing.

Once the working pressure reaches a predetermined threshold, a pressure responsive valve 18 which opens at this threshold, permits the pressure fluid to flow into the other cylinders 4 and 5 to then drive their pistons **4*a* and 5*a* downwardly to complete the working stroke. The cylinders 4 and 5 are, during the downward movement of the ram by the cylinder 3, filled with fluid from the tank 15 via valves 20 and filling valves 21**.

Initially at the end of the working stroke all of the cylinders are connected via lines 10 and 11 with the cylinders 3-5 to release the ram and raise the latter. Thereafter, only the cylinder 3 is supplied with fluid under pressure from the pumps while the remaining cylinders are connected to the reservoir 15, R, e.g. by the check valve 40. This permits rapid opening of the press. Unlike a conventional press in which a check motor is connected to the flywheel shaft and the pump shaft directly, in the system of the invention an electric motor 17 drives another variable-displacement pump 22 which, via one of the check valves 42 delivers fluid in a starting mode to the pumps 6 to drive the latter as hydraulic motors and generate the rotation of the flywheel 7 which represents the stored energy. This hydraulic supply can be continuous and can even remain during a working stroke since the pumps 6 will actually operate as motors only when their output pressures fall below the output pressure of the pump 22 and thus signify the drop in the available energy from the flywheel. Furthermore, when the pump 22 contributes to the supply of fluid to the system during the working stroke via the other check valve 42, the outputs of all three pumps can be utilized and hence the operating speed and pressing capacity can be increased.

In one mode of operation of the device mentioned previously, only the cylinder 3 is initially pressurized by the power unit 6, 7 and the hydraulic cylinders 4 and 5 are only subsequently energized from this unit. In an embodiment of the invention, the auxilliary power unit 17, 22 is connected to the power unit 6, 7 to assist in starting up of the latter and then is connected to the hydraulic cylinders 4 and 5 after being cut off completely from the power unit 6, 7. Various combinations of these modes can be used depending upon the desired pressing process and the particular press output which is preferred.

When the power unit 6, 7 is used to operate a press of the type in which the energy is primarily utilized to rest the ram and the ram is then permitted to fall, the auxilliary power unit 17, 22 can be coupled to the pumps 6 during the falling phase of the ram to recharge the power unit 6, 7 by driving the flywheel to increase its speed.

Other valves and control devices can be used to increase the versatility of the system by combining the outputs of all three pumps to feed only the cylinder 3, all three of the cylinders 3-5 or any groups of cylinders.

The drawing also shows that pressure relief valves 41 can be provided to assure that the pumps 6 deliver the same pressures to the line 32 while valve 43, by analogy to valve 35 can be controlled to permit draining of the cylinders 4 when predetermined pressures are reached. The check valve 44 permits the full flow from line 32 to be delivered to lines 11 for reverse operation of the ram, while the output from pump 22 can be delivered to the suction sides of the pumps 6 between these pumps and the respective check valves 45 and 46 connecting them with the reservoir R. A similar check valve is provided at 47 at the intake side of pump 22.

I claim:

1. In a hydraulic press having a movable press member, a control system for said press member which comprises in combination:
   - a plurality of spaced apart double-acting hydraulic cylinders operatively connected to said member;
   - a hydraulic pump flywheel unit comprising at least one variable-displacement hydraulic pump and a flywheel connected to a rotatable element of said pump for driving same, said pump having an outlet and an inlet;
   - hydraulic circuit means connected between said outlet and said cylinders for delivering hydraulic fluid from the pump of said hydraulic pump flywheel unit to said cylinders for displacing said member, said hydraulic circuit means including pressure responsive valves for initially connecting said pump to one of said cylinders and thereafter connecting said pump to others of said cylinders only upon the pressure in said one of said cylinders reaching a predetermined value; and a power unit including an electric motor, a flywheel-free further variable-displacement pump driven by said electric motor and communicating with said inlet to the first mentioned pump to operate the same as a motor to drive said flywheel to start said press and thereafter to store energy therein, said hydraulic pump flywheel unit being free from any other energy source, and means connecting said further pump to said hydraulic circuit independently of the concentration with said inlet.

2. The system defined in claim 1 wherein said hydraulic pump flywheel unit comprises a pair of first variable-displacement hydraulic pumps continuously connected to said flywheel and feeding through respective check valves a common duct of said hydraulic circuit means.

3. The system defined in claim 2 wherein said further pump is connected to said duct through at least one check valve.

4. The system defined in claim 3, further comprising a reservoir, said hydraulic circuit means including means for delivering hydraulic fluid from a nonpressurized side of said cylinder to said reservoir.

5. The system defined in claim 4, further comprising additional cylinders having respective pistons connected to said member and filling valves connected said additional cylinders to said reservoir for filling from said reservoir as said member is displaced by the first mentioned cylinder.

6. The system defined in claim 5, further comprising means connecting said additional cylinders to said hydraulic pump flywheel unit.

7. The system defined in claim 6 wherein the last-mentioned means includes a pressure-responsive valve connecting said additional cylinders to said hydraulic pump flywheel unit only upon the pressure in the first cylinder reaching a predetermined level.

* * * * *